US008417828B2

(12) United States Patent
Ma et al.

(10) Patent No.: US 8,417,828 B2
(45) Date of Patent: Apr. 9, 2013

(54) METHOD AND APPARATUS FOR EFFICIENT HTTP STREAMING

(75) Inventors: Kevin J. Ma, Nashua, NH (US); IChang Lin, Westborough, MA (US); Radim Bartos, Durham, NH (US); Swapnil Bhatia, Mumbai (IN)

(73) Assignee: Azuki Systems, Inc., Acton, MA (US)

( * ) Notice: Subject to any disclaimer, the term of this patent is extended or adjusted under 35 U.S.C. 154(b) by 112 days.

(21) Appl. No.: 13/085,752

(22) Filed: Apr. 13, 2011

(65) Prior Publication Data

US 2011/0191414 A1 Aug. 4, 2011

Related U.S. Application Data

(63) Continuation of application No. PCT/US2009/060120, filed on Oct. 9, 2009.

(60) Provisional application No. 61/106,305, filed on Oct. 17, 2008, provisional application No. 61/109,729, filed on Oct. 30, 2008, provisional application No. 61/109,737, filed on Oct. 30, 2008.

(51) Int. Cl.
*G06F 15/16* (2006.01)

(52) U.S. Cl. ........................................ 709/231; 709/203

(58) Field of Classification Search .................. 709/203, 709/231
See application file for complete search history.

(56) References Cited

U.S. PATENT DOCUMENTS

| | | |
|---|---|---|
| 2004/0049598 A1 | 3/2004 | Tucker et al. |
| 2005/0172028 A1 | 8/2005 | Nilsson et al. |
| 2005/0262261 A1 * | 11/2005 | Deshpande .................... 709/231 |
| 2008/0008089 A1 | 1/2008 | Bornstein et al. |
| 2008/0114889 A1 | 5/2008 | Deshpande |
| 2009/0089447 A1 * | 4/2009 | Balachandran et al. ...... 709/231 |

OTHER PUBLICATIONS

Cisco Application and Content Networking System (ACNS), 1 page.
"Adobe Flash Media Server," from Wikipedia, the free encyclopedia, 3 pages, Sep. 2008.
LimelightDELIVER, Deliver HTTP objects, large and small, to online audiences everywhere, 2 pages, 2008.
"QuickTime Streaming Server," from Wikipedia, the free encyclopedia, 1 page, Apr. 2008.
Schulzrinne, et al., "Real Time Streaming Protocol (RTSP)," RealNetworks, Network Working Group, Request for Comments (rfc2326), Apr. 1998, pp. 1-93.
Fielding, et al., "Hypertext Transfer Protocol—HTTP/1.1," W3C/MIT, Network Working Group, Request for Comments (rfc2616), Jun. 1999, pp. 1-114.

(Continued)

*Primary Examiner* — Abdullahi Salad
(74) *Attorney, Agent, or Firm* — BainwoodHuang

(57) ABSTRACT

A method and apparatus provide streaming delivery of data such as media data (video, audio) using a non-streaming delivery mechanism such as HTTP along with server-side pacing of the delivery. An initial portion of the media data is preloaded to a client buffer in a bursting manner to minimize latency. The method may include client request verification, support for client self-pacing, and support for catch-up pacing reductions. A proxy server apparatus may also be used which employs both server-side and client-side pacing and may include caching and both cache and client preloading for minimized latency. A similar proxy server apparatus may be used to provide an efficient alternative to client polling for data from a polled data service, such as stock quotes etc., using streaming updates. The method may include support for stream modification through persistent client requests.

32 Claims, 11 Drawing Sheets

OTHER PUBLICATIONS

"Really Simple Syndication (RSS)," from Wikipedia, the free encyclopedia, 7 pages, Sep. 2008.

"Windows Media Services (WMS)," from Wikipedia, the free encyclopedia, 2 pages, Aug. 2008.

* cited by examiner

METHOD AND APPARATUS FOR EFFICIENT HTTP STREAMING

BACKGROUND

This invention relates in general to streaming media and more specifically to streaming media using the HTTP protocol.

In data communications it is typically desirable to retrieve data as quickly as possible. This is not the case, however, for data which may be rendered over time (e.g. audio or video). The Hypertext Transfer Protocol (HTTP) is a popular Internet data retrieval protocol. In general HTTP requests are serviced as quickly as possible and HTTP does not take into account the possibility of rendering over time. The Real Time Streaming Protocol (RTSP), on the other hand, was designed to deliver data which may be rendered over time, in a just in time manner. RTSP is more complex, more computationally expensive, and less well supported than HTTP. Consequently, many still rely on HTTP for delivering audio and video content. The download as fast as possible paradigm, however, uses more bandwidth than is necessary, and requires that clients have buffer space to store the data, and encourages servers to use all available resources to send the data as quickly as possible. This is taxing for clients with limited resources (e.g. mobile devices). This also inhibits network and server scalability.

US Patent Application Publication 2008/0114889A1 by Deshpande describes a method for pacing from an existing web server, by calculating a strict pacing schedule, based on the target bit rate and the offset from the beginning of the file. Deshpande also allows for client specified segment sizes and target bit rates. The implied architecture, however, does not specifically address server scalability issues, client intelligence, or rendering optimizations.

Other known mechanisms include those described in RFC 3448, "TCP Friendly Rate Control (TFRC)", and in a paper by Wei et al. entitled "TCP Pacing Revisited".

SUMMARY

While the prior art includes basic concepts for paced output in other protocols, and an implementation for paced HTTP output, it does not address scalability of the servers which implement those protocols, or focus on the end user experience. The present invention includes architectural differences which allow for higher server scalability (e.g. segment size and pacing rate for range requests), as well as additional features for improving end user experience, specifically initial bursting for a client buffer preload, as well as support for client pacing.

In one embodiment, a computer system provides for streaming media data (e.g. an encoding of a video or audio) from a data file to a client over a network. A target bit rate is used for sending the data file. The target bit rate is calculated as a constant bit rate, given the file duration and file size (where "duration" refers to the length of time over which the media object represented by the media data is rendered, i.e., the playback time for a video or audio). The target bit rate is used to calculate a pacing delay. The pacing delay is used to insert delays between segments of data sent during a session in order to meet the target bit rate. In one embodiment, the segment size is determined by the TCP window size. In another embodiment, the segment size may be static. If the data requested is less than the segment size, but the session spans multiple requests, stateful information is maintained and delays are calculated using aggregate statistics including inter-request delay. In one embodiment, a catch up delay is also maintained, to keep track of the times that the pacing budget was missed. In such a case the time required to send the segment exceeded the pacing delay. This timing shortfall is accumulated and future pacing delays are discounted to make back the time.

A target burst size is also calculated, and the initial response to a request involves bursting an amount of data, greater than the segment size but not exceeding the target burst size, to preload the client buffer. The burst size may be calculated as a client buffer size in seconds multiplied by a constant bit rate which is the media data size divided by the duration. This reduces initial rendering latency for the client. The bursted data may be sent in batches to ensure fairness among different sessions for different clients, and a segment size for each batch may be calculated as a fixed percentage of the TCP window size.

One embodiment also verifies data requests to prevent unauthorized access, and to protect against denial of service. The verification information includes a user name (user ID) for authentication and an expiration timestamp. The user name and/or expiration information is secured using a hash which includes a pre-shared secret key. In one embodiment, the URL for the media is generated by another server. That server generates the hash value, using a secret key known to both the server and the present invention.

In one embodiment, the computer system may send media data in response to both non-range requests and range requests which exceed a predetermined threshold in a paced manner. The media data may be sent in batches and include calculating a delay equal to a segment size divided by the pacing rate, minus the transmission time for the current segment and minus a catch-up amount from previous segments, with the delay being enforced to have a minimum of zero. A faster pacing rate may be used when bursting the initial file data. The segment size may be calculated for each batch as a fixed percentage of the TCP window size. A carry forward may be accumulated which is equal to the absolute value of the delay when the actual delay would be less than zero, and this accumulation may involve stateful accounting of carry forward delay across persistent HTTP requests. The technique may also support client self-pacing by not pacing range requests which do not exceed a predetermined threshold, and may support client seek functionality by supporting range requests.

In another aspect, a computer system is disclosed for streaming data over a network, using a proxy server to retrieve data from a backend server (e.g., an origin server) in a paced manner, cache the received data and asynchronously stream the data to a requestor (client) in a paced manner. The backend pacing rate for retrieving the data is faster than the front end (client-facing) pacing rate, to prevent underflow when simultaneously retrieving data from the backend and streaming data on the front end. The front end pacing rate is calculated from the file specified bit rate. In one embodiment, the backend pacing is performed explicitly, using TCP window size adjustments and delayed ACKs. In another embodiment, the backend pacing is performed implicitly, using delayed reads (e.g., delayed HTTP range requests) and taking advantage of the inherent TCP back pressuring, wherein the delays are calculated based on the backend pacing rate. The front end pacing is performed explicitly, using delayed sends, wherein the delays are calculated based on the front end pacing rate.

The media data retrieved from the backend may be stored in a cache. If the file already exists in the cache, the file is served directly from the cache. In one embodiment, files are expunged from the cache after a predetermined timeout. In another embodiment, files are not expunged unless explicitly deleted, via a management console for example. If the file does not yet exist in the cache, retrieval of the content is initiated on the backend. The initial portion of the file is retrieved as fast as possible, while the remainder of the file is retrieved at the back end pacing rate. In one embodiment, the front end is signaled once the initial portion of the file has been retrieved. In another embodiment, the front end is not signaled until the entire file has been retrieved and verified using a file hash. The front end, upon being signaled, bursts the initial portion of the file to the client, in order to preload the client's buffer, while the remainder of the file is sent at the front end pacing rate.

The backend request protocol may be HTTP, or another protocol such as RTSP or FTP. The file metadata, bit rate, and cache location may be stored in a database for use in servicing future client requests. The origin server may be co-located in the same data center as the proxy server, or it may be in a remote data center.

In another aspect, a computer system is disclosed for streaming periodic data updates over a network. Examples of such data updates include live sports scores, live stock quotes, live news updates, location and status information for an individual (e.g., from a GPS type of device carried by the individual), and RSS feeds.

The system uses a proxy to offload polling overhead from a client by streaming updates to the client on the front end while asynchronously polling for backend data updates from a polled data service, on behalf of the client. The client initiates a single persistent connection to the proxy, specifying the data to be polled, the rate at which to poll, and the rate at which to send updates. The periodic polling is scheduled and results are checked against previous results held in a cache. If new results differ from the previously cached results, the cache is updated and an update is sent to the client. In one embodiment, if the latest results match the previously cached results, no updates are sent to the client. In another embodiment, duplicate results are sent to the client at each pacing interval.

In one embodiment, the backend polling is done via HTTP persistent GETs, to minimize connection setup and tear down overhead. In another embodiment, the backend polling may use other protocols, and may use separate transactions for each polling request. In one embodiment, the polling rate is equal to the streamed update pacing rate, to minimize unnecessary polling. In another embodiment, the polling and pacing rates may differ, in order to provide for front end or backend connectivity verification and keep-alives.

In one embodiment, the front end streaming updates are sent using HTTP chunk transfer coding and one and only one update is sent per segment. The chunk boundaries provide natural delineation between updates. HTTP chunks specify a length for the segment and have an end of chunk delimiter. Those skilled in the art will see that this is sufficient for determining the boundaries for individual updates. In another embodiment, proprietary message encapsulation formats may be used, either in lieu of, or in conjunction with, HTTP chunk transfer coding.

The client may update the session polling and/or streaming configuration using the persistent HTTP streaming connection. In one embodiment, the initial configuration is processed without receiving the entire HTTP request, using the information available in the currently available HTTP entity headers. The initial configuration is overridden by sending additional superseding headers as a continuation of the initial request. In another embodiment, persistent HTTP requests are processed immediately and the session configuration updated.

Query string parameters or custom entity headers may provide configuration information for the periodic updates. Examples of such configuration information and corresponding functions include specifying the data to be polled; specifying the polling rate; specifying the pacing rate; specifying user credentials for backend data polling; specifying the data format for the periodic updates; and specifying whether or not to send duplicate data if the data has not changed on the backend.

Persistent HTTP requests may be processed immediately, rather than pipelined, and in this case there may similarly be support for changing the data to be polled; changing the polling rate; changing the pacing rate; changing the user credentials for backend data polling; changing the data format for the periodic updates; halting periodic updates; and changing whether or not to send duplicate data, if there is no change on the backend.

The backend connection may be FTP, or it may be HTTP, in which case HTTP persistent requests may be used for polling for backend updates, and requests may be issued to the backend at a rate faster than the polling rate specified by the client, in order to keep the connection alive and verify the liveness of the connection.

Duplicate data may be issued if the pacing delay is exceeded and no update is available from the backend, and a previous update's data may be cached for use in sending such duplicate data. Alternatively, the proxy may refrain from sending any updates to the client if there are no updates available from the backend.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

It will be appreciated that the disclosed techniques can be embodied as software executing for example on a general-purpose or special-purpose computer hardware including memory, input/output circuitry, and instruction processing logic.

I. Streaming Media Server

Figure 1:
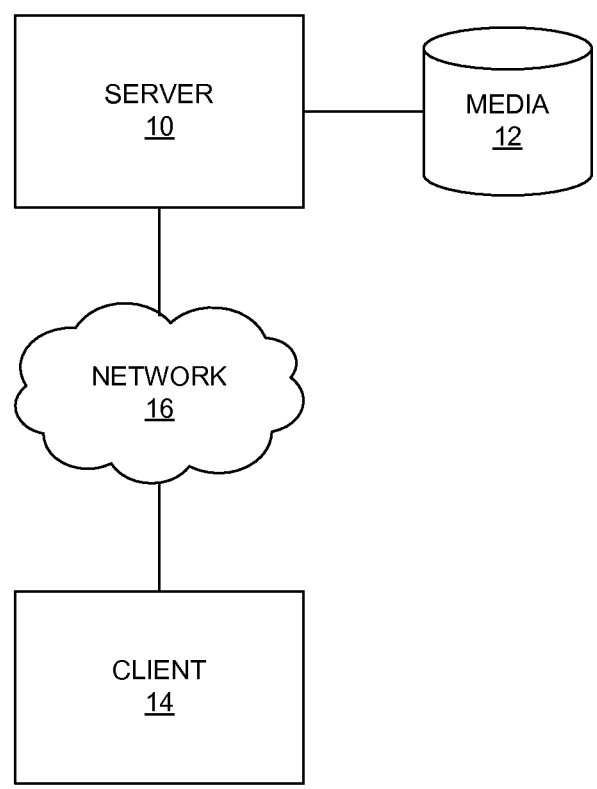
FIG. 1 is a general block diagram of a system for streaming data to a client.

FIG. 1 illustrates high-level system organization and operation. A server computer (server) 10 accesses media content (media) 12 and transmits the media content 12 to a client device (client) 14 via a network 16. The media content 12 is sent in a streaming fashion at or near a bit rate at which the media content is actually rendered or played to a user at the client device 14. However, the system does not employ typical streaming protocols such as RTP etc., but rather employs HTTP using paced content delivery for the reasons discussed above.

In FIG. 1 the server 10 may be referred to as an "origin server" to reflect that it has direct access to the media content 12 which is to be delivered. For example, the media content may be stored on local storage of the server 10 or in a common data center. However, it will be apparent that various aspects of the server 10 may also be incorporated in a so-called "proxy server" which may be located between the client 14 and a separate origin server. Specifically, aspects pertaining to the delivery of the media content 12 to the client 14 may be utilized by such a proxy server. A configuration of this type is specifically described below.

Both the server computer 10 and client device 14 are computerized devices including one or more processors, memory, input/output circuitry and local storage all connected together by one or more data buses, along with software executed by the processor(s) to perform certain functions as described herein. The client device 14 may be a mobile device such as a portable computer or personal digital assistant (PDA), or an advanced personal communications and data device such as an iPhone®, Blackberry®, etc. It is to be noted that the term "requestor" is used herein to refer to the source of a request. For present purposes any references to a requestor can be interpreted as referring to a client 14.

Figure 2:
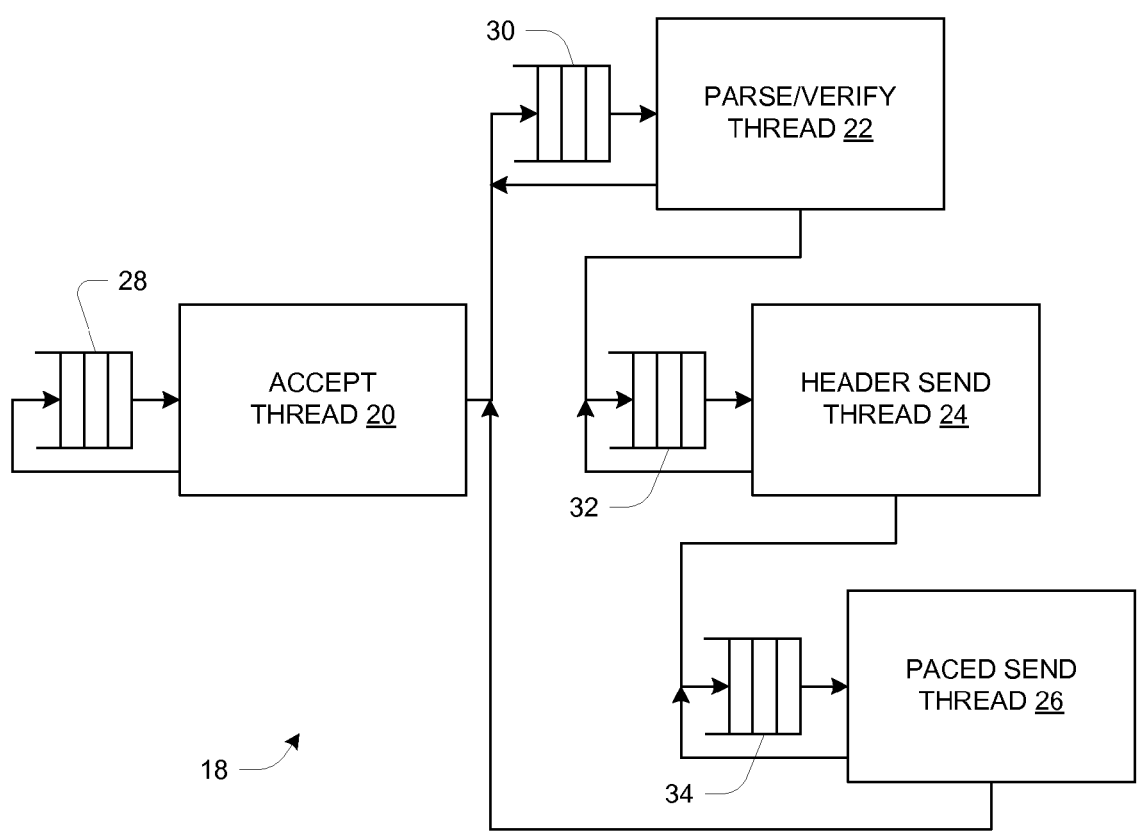
FIG. 2 is a block diagram of an organization of software usable in a server of a data streaming system.

FIG. 2 shows an embodiment of a software organization 18 for the server 10 which includes a four-stage pipeline for processing requests. Each stage 20, 22, 24, and 26 is implemented as a separate thread in the organization 18, where each thread maintains a respective queue of sessions 28, 30, 32, and 34 respectively. In another embodiment, each session could be serviced by its own thread or process. The thread per stage limits the number of threads required, which reduces the server resources required. The queues allow each thread to handle multiple sessions. Each queue is ordered based on absolute time. Sessions are inserted with a target time for next servicing. In the thread per session implementation, a simple delay may be used for pacing, however, to support multiple sessions in a single thread, the priority queue model allows the most immediate session to be identified and serviced first. The delay need only delay as long as is required by the most immediate session.

An Accept thread 20 accepts new socket connections and creates a session for each new connection. As long as the total number of active sessions in the system has not exceeded a predefined active session threshold, the new session is added to queue 30. If the number of active sessions exceeds the predefined threshold, the new session is queued to queue 28. Queue 28 may be realized as the "listen queue" in the TCP stack of the operating system, in which case all incoming TCP connections are in the queue 28 but they do not necessarily constitute sessions until they are accepted by Accept thread 20.

As active sessions are removed from the system, either because a session completes, is rejected, or some other condition occurs, new sessions are de-queued from queue 28 are placed on queue 30. A separate predefined threshold is used for the total number of socket connections allowed, wherein the number of sockets threshold should be higher than the number of active sessions threshold. The number of sockets threshold is enforced through listen and accept application programming interfaces (APIs) as well as by configurable limits of the underlying operating system of server 10.

A Parse/Verify thread 22 is responsible for reading in requests, parsing the requests, and verifying the requests. Verifying the requests includes verifying the well formedness of the request, verifying the permissions for the user name provided, verifying that the expiration time has not been exceeded, and verifying that the request parameters have not been tampered with by verifying a hash token which is provided as part of the request. The hash requires a synchronized pre-shared secret and an MD5 or SHA1 hash. The pre-shared secret must be known to both the generator of the URL and the proxy processing the URL request, in this case, a server such as the server 10 of FIG. 1. Pre-shared secrets are typically shared out-of-band using one of many methods which should be well known to anyone skilled in the art. Other embodiments may choose to use other cryptographic methods for tamper proofing. Parse/Verify thread 22 also verifies the availability of the file requested. If any of the verification steps fails, the session is rejected. If the request is verified, the session is queued to queue 32. If the request is not yet available or not yet complete, a delay is set using linear back-off and the session is requeued to queue 30. If the delay exceeds a predetermined threshold, the session is rejected. In other embodiments, a different algorithm for timing out request reception could be used.

A Header Send thread 24 is responsible for creating response headers and sending the response headers to the client 14. The response header values are determined based upon the request header values and the characteristics of the file being served. Once the response has been sent, the session is queued to queue 34. If sending the response has not yet completed, a delay is set using linear back-off and the session is requeued to queue 32. If the delay exceeds a predetermined threshold, the session is rejected. In other embodiments, a different algorithm for timing out response delivery could be used.

The support for multiple sessions in a single thread necessitates the use of non-blocking sockets. The timeouts allow for a level of prioritization for more active sessions and also allow for recovery from denial of service attacks. More aggressive timeout schemes may be used if denial of service is prevalent. In cases where client connections incur high latency or high loss, less aggressive timeout schemes prevent undue session rejection.

A Paced Send thread 26 is responsible for the bursting of initial data and the pacing of subsequent data delivered to the client 14 for each request. Each time a session is serviced, a fixed sized segment of data is sent. In one embodiment, the segment size is set to be one half the maximum TCP window size for the session. Using TCP window size, rather than client buffer size, for segment size determination allows TCP flow control to better manage the connection. It is also more optimal for internal DMA transfers. If the client buffer size is much less than the TCP window size, then the overhead of DMA becomes large. Otherwise, if the client buffer size is much larger than the TCP window size, then the DMAs will not be able to service the full segment size. In other embodiments, the segment size may be chosen based on other server bottlenecks.

If all the data for the current request has been sent and the session supports persistence, the session is queued to queue 30 to await the next persistent request. If all the data for the current request has been sent and the session does not support persistence, the session is closed. In one embodiment, if not all of the data for the current request has been sent, and the amount of data sent is still below the bursting threshold, or the request was a range request below the range pacing threshold, a predetermined minimum delay is set and the session is requeued to queue 34. The minimum delay ensures fairness for other queued sessions. In another embodiment no minimum delay is used, and the session is queued for immediate reservicing. Otherwise, if not all of the data for the current request has been sent out, and the session is pacing, a pacing delay is then calculated, discounting for any carry forward catch up delay discounts. If the delay is negative, the absolute value of the delay is accumulated into the carry forward delay and the delay is set to a predetermined minimum delay and the session is requeued to queue 34. The minimum delay ensures fairness for other queued sessions. In another embodiment no minimum delay is used, and the session is queued for immediate reservicing. If the delay is positive, then that delay is set and the session is requeued to queue 34.

For maximum scalability and fairness, the minimum delay should be enforced. Even in high end server hardware, where the server processing resources are not a bottleneck, most likely the network resources are a bottle neck, and processing at the maximum rate, when the system is stalled, waiting on the network, is wasteful of both energy and resources. For mobile clients 14 having limited resources, sending at a maximum rate may also cause unwanted sluggishness as the device resources will be overwhelmed processing the incoming data.

Figure 3:
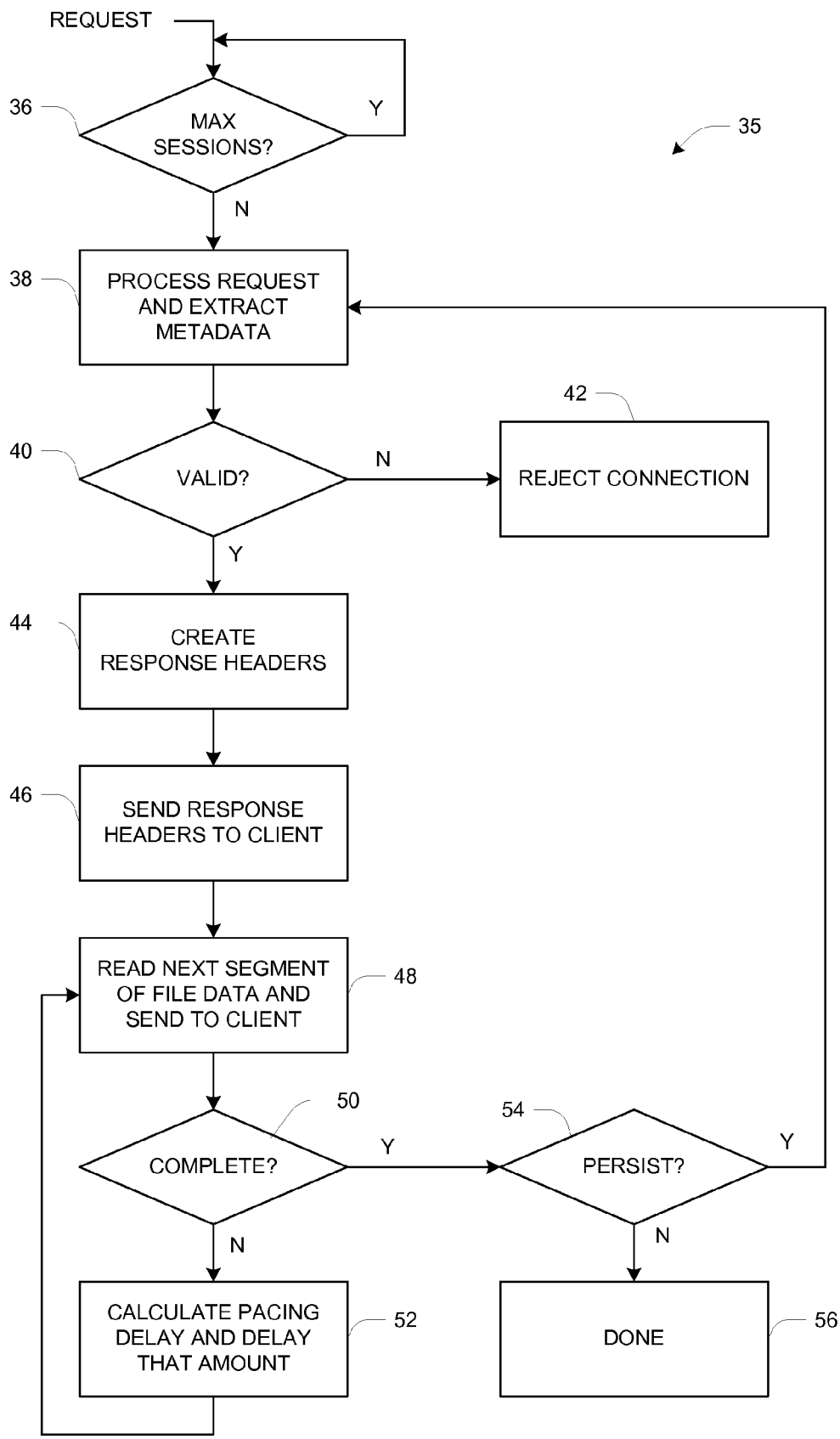
FIG. 3 is a flow chart showing a method for servicing an HTTP streaming request, in accordance with an embodiment of the present invention.

FIG. 3 is a flow chart showing a process 35 for servicing client requests. The Accept thread 20 of FIG. 2 performs step 36, checking to see if a predefined maximum number of active sessions has been reached or exceeded. If the maximum number of active sessions has not been reached or exceeded, then processing continues at step 38.

The Parse/Verify thread 22 performs steps 38, 40, and 42, reading and parsing the request, verifying the request and rejecting if necessary, and extracting metadata required to calculate pacing rate and pacing delay. In step 38, the HTTP entity headers are parsed and metadata is extracted including the request method, request uniform resource identifier (URI), host request header, user agent request header, connection request headers and range request header. These headers are all specified in the HTTP 1.1 RFC and should be well known to those skilled in the art. In one embodiment, a single supported request method of GET is enforced and the file name, timestamp, user name, and hash value are extrapolated from the URI. The GET method should be sufficient for all client requests and all necessary request parameters should fit within the URL length limitations. In another embodiment, other request methods may be supported and the file name, timestamp, user name and hash value may be encoded using proprietary HTTP entity headers or the HTTP entity body for better clarity or to accommodate space limitations.

In step 40, the information extracted in step 38 is used to verify the request. The request and request headers are checked for well-formedness. The request method is checked for predetermined valid values. If the request method is not one of the predetermined valid values, the session is rejected (step 42). The file name is used to check for the existence of the requested file. If the requested file does not exist, the session is rejected (step 42). The user name is checked for predetermined valid values. If the user name is not one of the predetermined valid values, the session is rejected (step 42). In one embodiment of the invention, the user agent may be used for further validation of the client device. If the user agent is not one of a predetermined set of valid values, the session may be rejected (step 42). The user agent specifies basic device capabilities as well as a device identifier which can be used to look up additional device capabilities. If those capabilities do not meet the streaming requirements, then the session may be rejected (step 42). The timestamp is checked for expiry. If the timestamp has expired the session is rejected (step 42). The request host and URI are used to verify the hash value, using the pre-shared secret. The hash is regenerated using the request host and URI and pre-shared secret and checked against the hash provided in the request. If the hash value does not match, the session is rejected (step 42). Next, metadata is extracted from the file specified, specifically: the file size, in bits, the file duration, in seconds, and the file mime-type. The file size and file duration are used to calculate the target client bit rate. The target client bit rate is checked to see if it would cause the system to exceed a predetermined maximum bandwidth threshold. If the predetermined maximum bandwidth would be exceeded by servicing this session, then the session is rejected (step 42). If the range header was provided, the byte range is checked against the file size. If no range header was provided, the default range of 0 to (file size—1) is used. If the range of data requested would exceed the data available in the file, then the session is rejected (step 42).

Once the request has been validated, step 44 uses the metadata to generate the HTTP response headers. The session is then queued to queue 32.

The Header Send thread 24 performs step 46, sending the HTTP response headers to the client 14. The response headers were created in step 44 by Parse/Verify thread 22. If an error or timeout occurs in sending the response headers, the session is rejected. Otherwise, on completion of sending the response headers, the session is queued to queue 34.

The Paced Send thread 26 performs steps 48, 50, 52, and 54, bursting and pacing data delivery to the client 14. In step 48, a fixed size segment of data is read from the file, at the current offset, and sent to the client. In one embodiment, the fixed segment size is set to be half the maximum TCP window size. In other embodiments, the fixed segment size may be a different value. If a range was specified in the request, the initial file offset is determined by the beginning of the range specified by the HTTP request. If no range was specified in the request, the offset is set to the beginning of the file. After each segment send, the offset is updated with the actual amount of data sent. In step 50, the total number of bytes sent is compared with the total number of bytes requested. If the request has not been filled, then step 52 determines what level of pacing should occur, and processing from step 48 is repeated as shown. If the request has been filled or completed, then step 54 checks to see if the connection is persistent, as specified by the connection request header. If the connection is persistent, then the session is queued to queue 30 for processing of the next persistent request, and processing is repeated from step 38 as shown. Otherwise, if the connection is not persistent, then the session is complete and the session is closed (step 56).

Pacing provides for the most efficient server resource usage, however, optimal server resource usage is not always optimal for the client experience. To decrease latency in initial rendering of the file, the initial portion of the file is bursted to the client 14 to preload its rendering buffer. In one embodiment, the client buffer size is determined from a user agent, where a direct correlation between device name and device capabilities is known. In other embodiments, the client buffer size may be inferred from other metadata or specified by the client 14 explicitly. The burst size, in bits, is determined by the client buffer size, in seconds, divided by the bit rate, in bits per second. If the amount of data sent has not yet exceeded the burst size, then the data is sent at a burst rate, where the burst rate is faster than or equal to the bit rate, but less than or equal to the maximum available bandwidth of the server. In most cases the maximum possible bandwidth available to the server will exceed the client's maximum available bandwidth, therefore it is inefficient to use the servers maximum bandwidth. In one embodiment, the burst rate should not be allowed to exceed a predetermined peak per session bandwidth, and if the burst rate would cause the maximum server bandwidth to be exceeded, the burst rate should be tempered. The burst rate is recalculated for each session, each time through step 48, so that fluctuations in the number of active sessions and number of actively bursting sessions can be dynamically accounted for. The burst rate is calculated from the total excess server bandwidth where the excess bandwidth is equal to the total bandwidth minus the non-bursting bandwidth required by all active sessions. The excess bandwidth is divided equally between all actively bursting sessions. In another embodiment, excess bandwidth may be assigned to sessions using a priority scheme, where priority is given to older sessions, or newer sessions, or higher priority users.

Another alternative to consider is client self-pacing. Without direct client feedback to the server 10, the client 14 may know better than the server 10 what its buffer capacity and needs are, for optimal rendering. In such a case, the client may employ range GETs so that it may more granularly control data retrieval. In such cases, server side pacing could cause underrun of the client buffer. Not all range requests imply that client self-pacing is occurring, however. In one embodiment, only consistent range requests whose size do not exceed a predetermined threshold, are inferred to be for client side pacing purposes. If persistent range requests are consistently below the predetermined threshold, then no server-side pacing should be performed. A minimum delay is still calculated to provide fairness to other sessions. This minimum delay is used as the pacing delay.

In step 52, the pacing delay is determined and the session is requeued to queue 34. If the minimum delay is being used for range pacing, then the pacing delay is set to the minimum delay. Otherwise, the pacing delay is calculated as the segment size, in bits, divided by the bit rate, or burst rate if bursting, in bits per second. The pacing delay is then compared to the amount of time since the last segment was sent. If the time since the last send is greater than the pacing delay, then the minimum delay is used, and the difference between the time since the last send and the pacing delay is accumulated into the carry forward catch up delay. If the time since the last send is less than the pacing delay, than the delay time is set to the difference between the pacing delay and the time since the last send. If there is a carry forward catch up delay, then the delay is discounted by the carry forward pacing delay. If the delay is greater than the carry forward catch up delay, then the delay is set to the difference between the delay and the carry forward catch up delay, and the carry forward catch up delay is reset. If the delay is less than the carry forward catch up delay, then the carry forward catch up delay is reduced by the delay amount. In either case, if the delay is less than the minimum delay, the delay is set to the minimum delay. The calculated delay value is set and the session is requeued to queue 34.

Pseudo code for calculating the pacing delay for step 52 and reinserting the session into the priority queue 34 is shown below. In the pseudo code, the value "overhead" refers to the time taken to transmit a segment or portion of a segment in the current interval:

```
priority_queue pq;              // sorted by next send time
struct session {
   integer catchup_delay;       // in seconds
   integer bit_rate;            // in bits per second
   integer segment_size;           // in bits
   integer bits_sent;           // in bits
   integer burst size;          // in bits
   integer last_send_time;      // in offset of seconds from epoch
   integer next_send_time;      // in offset of seconds from epoch
} s;
send_start_time = Time( )
actual_bits_sent = send_segment(offset = s.bits_sent, length =
s.segment_size)
s.bits_sent = s.bits_sent + actual_bits_sent
send_end_time = Time( )
if s.bits_sent < s.burst_
   delay = MIN_DELAY
else
   overhead = send_end_time – send_start_time
   delay = (actual_bits_sent / s.bit_rate) – overhead
   if (s.catchup_delay >= delay)
      s.catchup_delay = s.catchup_delay – delay + MIN_DELAY
      delay = MIN_DELAY
   else
      s.catchup_delay = 0
      delay = delay – catchup_delay
      if delay < MIN_DELAY
         s.catchup_delay = MIN_DELAY – delay
         delay = MIN_DELAY
      endif
   endif
endif
s.last_send_time = Time( )
s.next_send_time = Time( ) + delay
pq.insert(session)
```

II. Streaming Media Proxy Server

Figure 4:
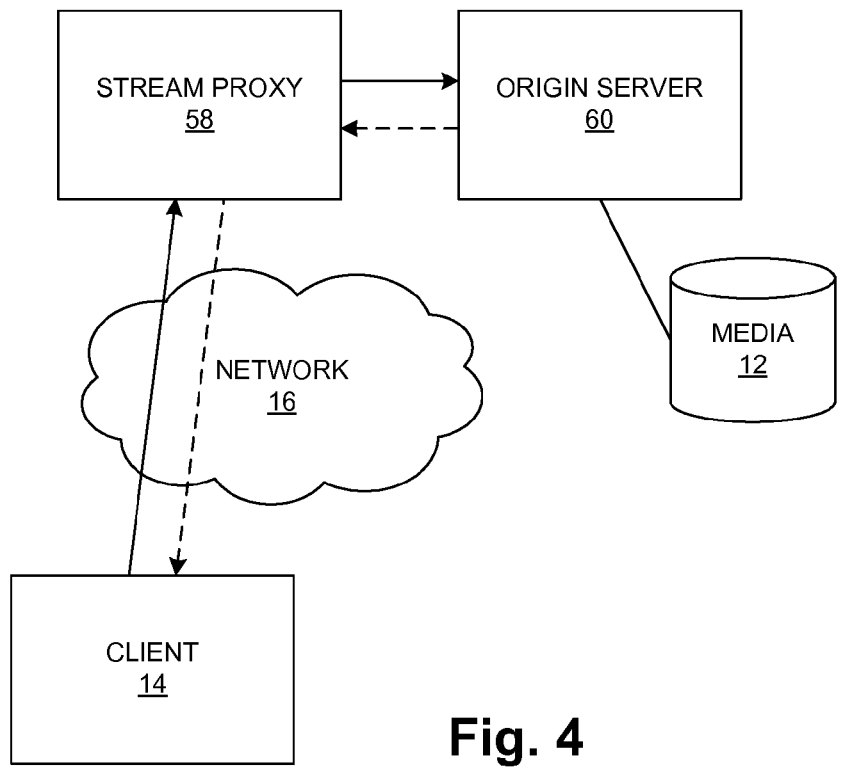
FIG. 4 is a diagram of an embodiment using a proxy server (proxy) co-located in the same data center as an origin server.

FIG. 4 shows an arrangement in which a client 14 connects to a proxy server (shown as "stream proxy") 58, which parses the configuration and initiates a backend connection to an origin server 60 which hosts the content 12 the client 14 wishes to view. The proxy server 58 paces the retrieval from the backend server 60 and streams the requested data to the client 14. The origin server 60 is co-located with the proxy 58 in the same data center, for example.

Figure 5:
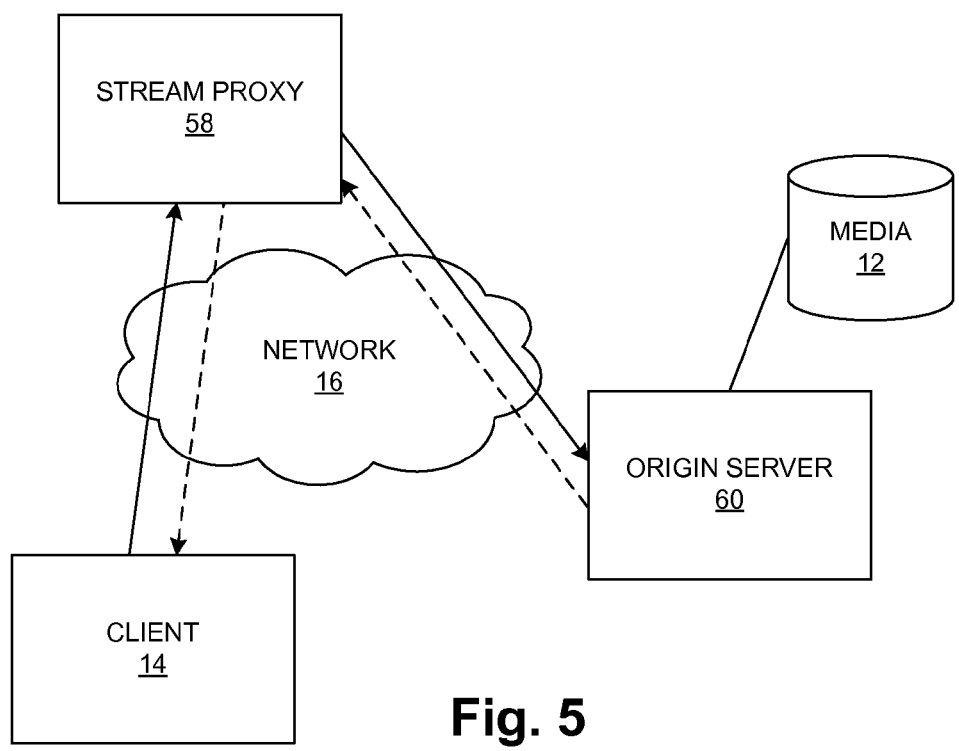
FIG. 5 is a diagram of a deployment in which the proxy is not co-located in the same data center as the origin server.

FIG. 5 shows a similar arrangement in which the proxy server 58 is not co-located with the origin server 60, but rather they are connected to each other across the network 16.

It will be appreciated that the proxy server 58 is also a computerized device such as described above for the server 10.

Figure 6:
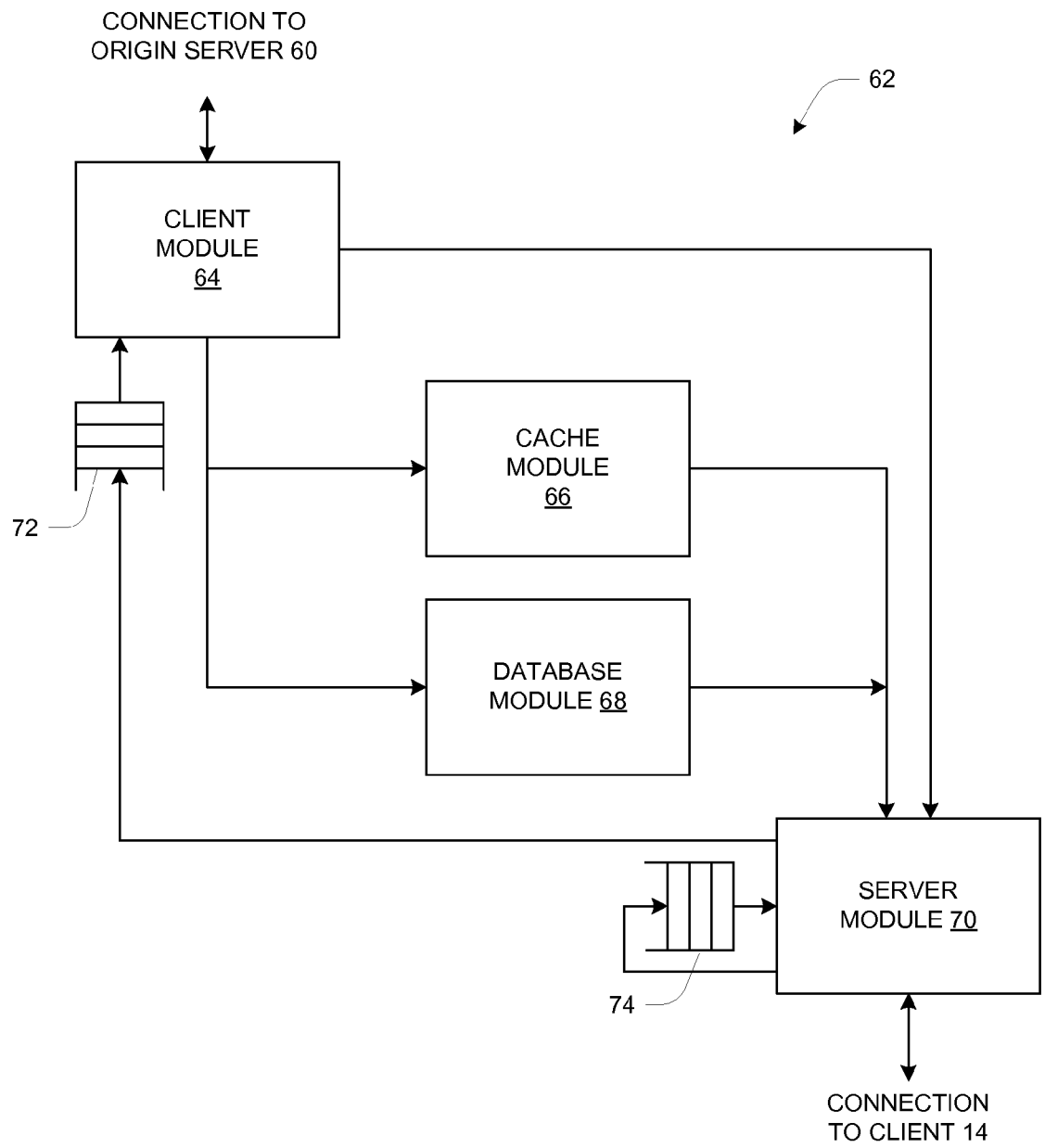
FIG. 6 is a block diagram of an organization of software usable in a proxy server of a data streaming system.

FIG. 6 is a block diagram of an organization 62 of the streaming data proxy server 58 in accordance with an embodiment of the invention, showing interactions between a server module 70 and a client module 64, as well as a flow of data through a cache module 66 and a database module 68. The server module 70 interfaces to the client 14 and accepts and processes requests for streaming data, creating new streaming sessions. The server module 70 checks the cache module 66 to see if the requested file is available. If the file is available, the streaming session is queued to queue 74. The server module 70 reads the file metadata information for the file from the database module 68 and uses that information to calculate the pacing rate. If the file is not available in the cache module 66, the server module 70 signals the client module 64 to download the file. The server module 70 creates a new download session and inserts it into queue 72. The server module 70 may process other sessions from queue 74 while waiting for the file to become available in the cache module 66.

The client module 64 interfaces to the back-end origin server 60, and in response to the signaling from the server module 70 the client module 64 initiates a request for the file to the backend origin server 60. The client module 64 downloads the file and writes it to the cache module 66. The client module 64 downloads the initial portion of the file at a predetermined per session maximum rate, and then paces the download of the remainder of the file. Once the initial portion of the file is downloaded, the client module 64 extracts metadata from the file and writes it to the database module 66. The metadata should include, but not be limited to, the file name, the file size, the file duration, the file format and data encoding formats. The client module 64 then signals the server module 70, and the server module 70 reads the file metadata information for the file from the database module 68 and uses that information to calculate the pacing rate. The pacing rate is used to queue the streaming session in queue 74. The server module 70 then reads the initial portion of the file from the cache and sends it, at its maximum per session rate, to the requestor, to preload its buffer. The server module 70 then uses the calculated client pacing rate to stream the remaining file data to the requestor.

The client module 64 and the server module 70 are both implemented as individual threads within the single software organization 62. In another embodiment, each session in the client module 64 and/or each session in the server module 70 could be serviced by its own thread or process. The single thread per module limits the number of threads required, which reduces the server resources required. The queues 72 and 74 allow each thread to manage and prioritize multiple sessions. Each queue is ordered based on absolute time. Sessions are inserted with a target time for next servicing. In the thread per session implementation, a simple delay may be used for pacing, however, to support multiple sessions in a single thread, the priority queue model allows the most immediate session to be identified and serviced first. The delay need only delay as long as is required by the most immediate session.

It will be appreciated that the streaming data proxy server 58 may employ one or multiple processors, and in the case of multiple processors they may be either tightly coupled or loosely coupled, such as the case of separate computer physical enclosures communicatively coupled by a network. The modules 64-70 in general may be distributed across multiple separate processors and employ any of various forms of inter-processor communications as generally known in the art.

Figure 7A:
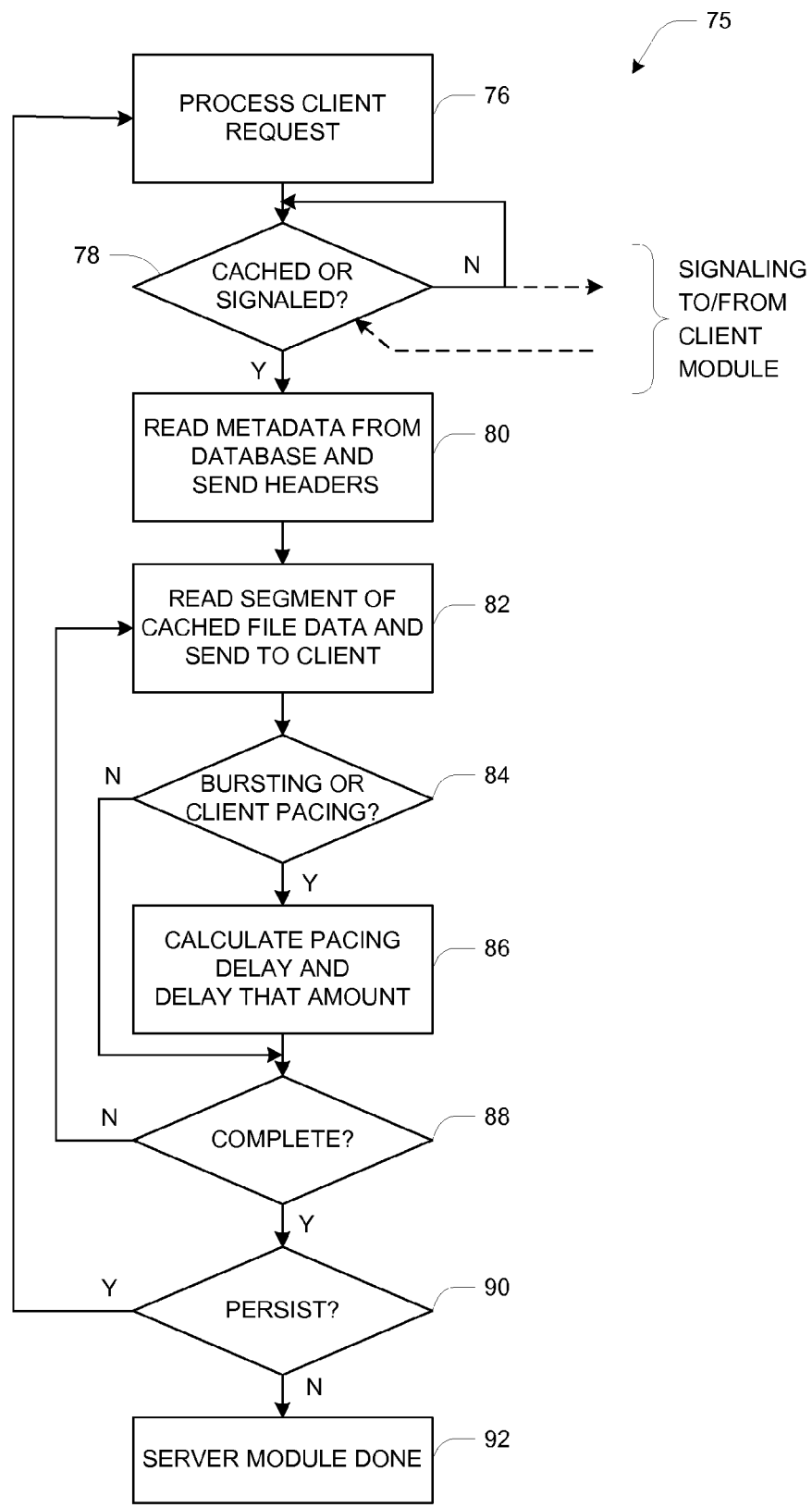
FIGS. 7A and 7B together provide a flow chart showing a method for servicing an HTTP streaming request using a proxy, in accordance with an embodiment of the present invention.
Figure 7B:
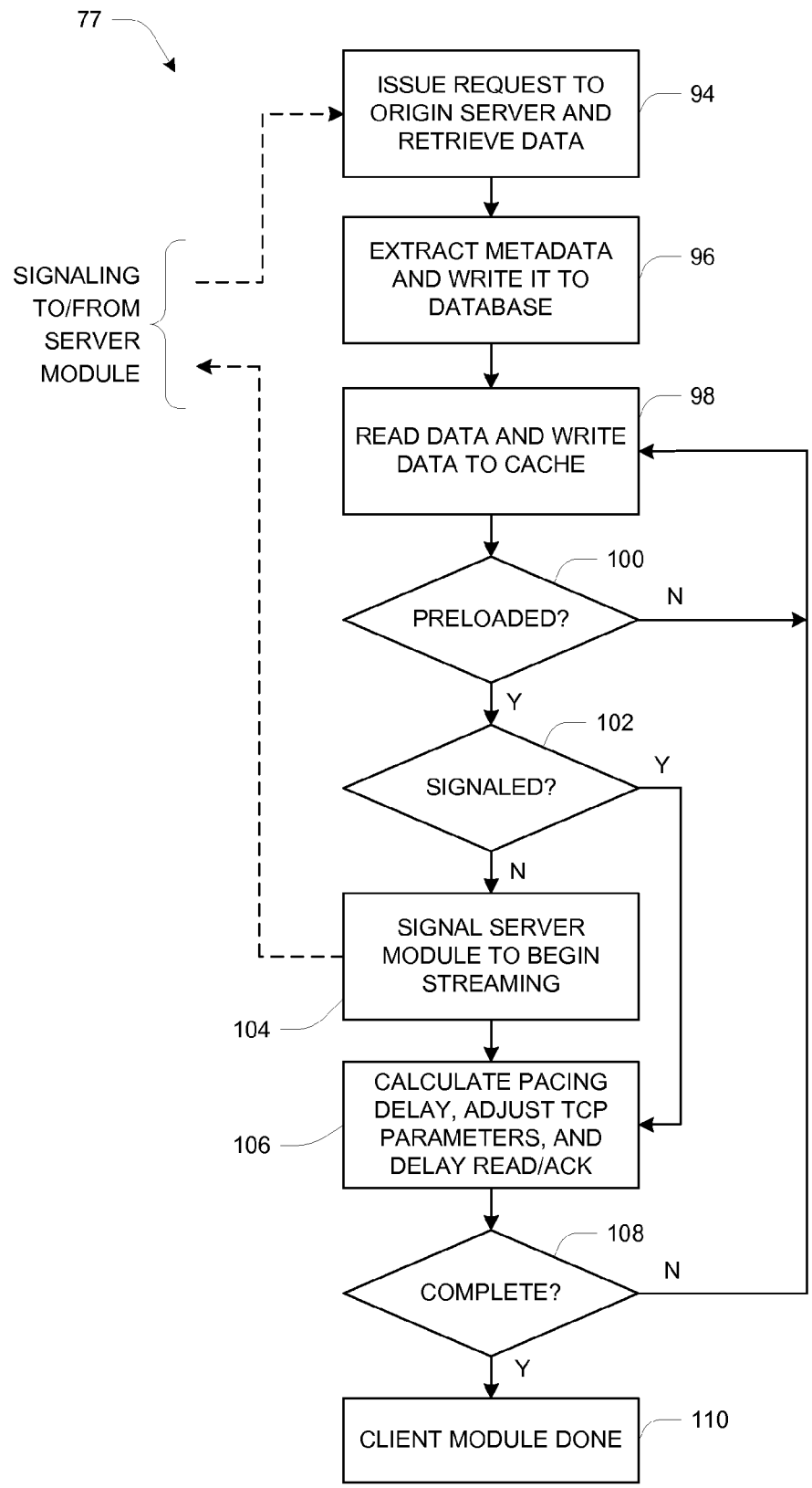

FIGS. 7A and 7B together form a flow chart showing a process for servicing client requests in the proxy server 58 of FIGS. 4-6. The process is divided into two parallel sets of functions 75 (FIG. 7A) and 77 (FIG. 7B). The functions 75 are functions of the server module 70, and the functions 77 are functions of the client module 64. Messaging between server module 70 and client module 64 is shown in notifications sent by the server module 70 to the client module 64, between steps 78 and 94, as well as the notifications sent by the client module 64 to the server module 70, between steps 104 and 78. The cache module 66 and database module 68 are not active processes requiring a flow chart; they are accessed by the server module 70, in steps 80 and 82, and by the client module 64, in steps 96 and 98.

In step 76, the server module 70 receives an HTTP streaming request and extracts the file name and location of the file being requested. Step 78 then checks to see if the file is already in the cache module 66 (cached) or has just been placed in the cache module 66 by the client module (signaled; see below for further description). Once the file is present in the cache module 66, then processing proceeds to step 80 where the server module 70 reads the file metadata from the database module 68. The metadata contains information used to create the HTTP response headers, as well as calculate the pacing rate for the file. The HTTP response headers are sent to the requestor and the session is added to the streaming priority queue 74. The priority queue 74 is processed by step 82 where a fixed size segment of file data is read from the cache module 66, from the current file offset, and sent to the client 14. The fixed sized segment is set to be a predetermined percentage of the maximum TCP buffer size. In one embodiment, the segment size is set to be one half the maximum TCP window size for the session. Using TCP window size for segment size determination allows TCP flow control to better manage the connection. It is also more optimal for internal DMA transfers. If the client buffer size is much less than the TCP window size, then the overhead of DMA becomes large. Otherwise, if the client buffer size is much larger than the TCP window size, then the DMAs will not be able to service the full segment size. In other embodiments, the segment size may be chosen based on other server bottlenecks.

In step 84, the session is checked to see if bursting or client pacing is being employed. During the initial file streaming stage, data is bursted at a higher rate than the pacing rate, in order to preload the requestor buffer, but less than or equal to the maximum available bandwidth of the server module 70. In most cases the maximum possible bandwidth available to the server module 70 will exceed the requestor's maximum available bandwidth, therefore it is inefficient to use the server module 70's maximum bandwidth. The burst rate should not be allowed to exceed a predetermined peak per session bandwidth. If the burst rate would cause the maximum server bandwidth to be exceeded, the burst rate should be tempered.

Requestor based pacing is also supported through range requests, wherein the range request references an amount of data less than a predetermined threshold. The predetermined range request threshold is used to prevent degenerate range requests from taxing the resources of the server module 70. Without direct client feedback to the server 58, the client 14 may know better than the server 58 what its buffer capacity and needs are, for optimal rendering. In such a case, the client may employ range GETs so that it may more granularly control data retrieval. Not all range requests imply client side pacing, however. In one embodiment, only consistent range requests whose size does not exceed a predetermined threshold, are inferred to be for client side pacing purposes. If persistent range requests are consistently below the predetermined threshold, then no pacing should be performed. The threshold should be similar to the segment size selection, e.g. the TCP window size If pacing is required, step 86 calculates the pacing delay, taking into account processing overhead and carry forward overhead and queues the session for servicing after that delay. Step 88 checks to see if the file has been streamed to completion. If the streaming is not complete, the session is requeued and processing proceeds back to step 82 for further streaming. If the streaming is complete, processing proceeds to step 90 where a persistence check is done. If the connection supports persistent HTTP requests, processing proceeds back to step 76 where the next request is processed. If persistent HTTP requests are not supported, then the server module processing is completed, the session is removed, and the connection is closed in step 92.

Referring to FIG. 7B, if the check in step 78 of FIG. 7A fails and the file is not found in the cache module 66, then at step 94 the client module 64 is notified and a backend request to the origin server 60 is issued. The response data is processed and relevant file metadata is extracted in step 96. Metadata including the codecs, bit rates, file type, file duration, and file size are extracted and written to the database module 68. In step 98, file data is written to the cache module 66. To facilitate the bursting performed by the server module 70, the client module 64 preloads the initial portion of the file from the origin server 60. The amount of data to be preloaded should exceed the amount of data which is to be bursted to the client. The amount of data to be bursted to the client is determined by the bit rate of the file and the size of the client's buffer, wherein the buffer size in seconds, divided by the bit rate in bits per second, determines the number of bits to burst. The preload threshold is set at a fixed percentage, greater than 100, of the burst size. In step 100, the client module 64 checks to see whether preloading is complete. Preloading is complete if the total amount of data retrieved so far exceeds the preload threshold. If not, processing proceeds back to step 98 for further data retrieval, without pacing. A maximum retrieval rate for the session, less than the maximum retrieval rate of the client module 64, is enforced, to ensure fairness between backend sessions.

Once the back end preload is complete, processing proceeds to step 102 where the signaling check is performed. The first time through step 102, step 104 is processed which signals the server module 70 that the preloading is complete. This signal releases the server module 70 from step 78. With the initial portion of the file in the cache module 66, the server module 70 may begin servicing the request, in parallel with the remainder of the backend download. Once the server module 70 is signaled, processing proceeds to step 106, where the backend pacing delay is calculated, taking into account processing overhead and carry forward overhead, and the session is queued for servicing after that delay. The backend pacing delay is enforced to be less than the front end pacing delay to prevent underflow of the server module 70 through the cache module 66. In step 108, a check is done to see if the file download from the backend origin server 60 is complete. If the download is not yet complete, processing proceeds back to step 98 to continue downloading. If the download is complete, then the session is removed and the connection closed in step 110.

Pseudo code for calculating the pacing delay for steps 86 and 106 and reinserting the sessions into the priority queues 74 and 72 by the server module 70 and client module 64, respectively, is shown below. In the pseudo code, the value "overhead" refers to the time taken to receive or transmit a segment or portion of a segment in the current interval:

```
priority_queue client_pq;           // sorted by next send time
priority_queue server_pq;           // sorted by next send time
struct client_session {
    integer catchup_delay;          // in microseconds
    integer client_buffer_size;     // in seconds
    integer file_duration;          // in seconds
    integer file_size;              // in bits
    integer segment_size;           // in bits
    integer total_bits_retrieved;   // in bits
    integer last_send_time;         // in offset of seconds from epoch
    integer next_send_time;         // in offset of seconds from epoch
} c;
struct server_session {
    integer catchup_delay;          // in microseconds
    integer client_buffer_size;     // in seconds
    integer file_duration;          // in seconds
    integer file_size;              // in bits
    integer segment_size;           // in bits
    integer total_bits_sent;        // in bits
    integer last_send_time;         // in offset of seconds from epoch
    integer next_send_time;         // in offset of seconds from epoch
} s;
client_module {
    loop
        s = client_pq->pop( )
        file_bit_rate = s.file_size / s.file_duration;
        burst_size = s.client_buffer_size / file_bit_rate;
        preload_threshold = s.burst_size * 1.1;
        backend_bit_rate = s.file_bit_rate * 1.1;
        retrieve_start_time = Time( );
        actual_bits_retrieved = read_to_buffer(offset = total_bits_received,
                                               len = segment_size)
        write_buffer_to_cache(len = actual_bits_read)
        retrieve_end_time = Time( );
        s.total_bits_retrieved = s.total_bits_retrieved + actual_bits_read
        if s.total_bits_retrieved > preload_threshold
            overhead = retrieve_end_time - retrieve_start_time
            delay = (actual_bits_sent / backend_bit_rate) - overhead
            if (s.catchup_delay >= delay)
                s.catchup_delay = s.catchup_delay - delay + MIN_DELAY
                delay = MIN_DELAY
            else
                s.catchup_delay = 0
                delay = delay - catchup_delay
                if delay < MIN_DELAY
                    s.catchup_delay = MIN_DELAY - delay
                    delay = MIN_DELAY
                endif
            endif
        else
            delay = MIN_DELAY;
        endif
        s.last_send_time = Time( );
        s.next_send_time = Time( ) + delay;
        client_pq->push(s)
        s = client_pq->top( )
        delay(s.next_send_time - Time( ));
    endloop
}
server_module {
    loop
        s = server_pq->pop( )
        file_bit_rate = s.file_size / s.file_duration;
        burst_size = s.client_buffer_size / file_bit_rate;
        send_start_time = Time( );
        actual_bits_sent = send_from_file(offset = total_bits_sent,
                                          len = segment_size)
        send_end_time = Time( );
        s.total_bits_sent = s.total_bits_sent + actual_bits_sent
        if s.total_bits_sent > burst_size
            overhead = send_end_time - send_start_time
            delay = (actual_bits_sent / file_bit_rate) - overhead
            if (s.catchup_delay >= delay)
                s.catchup_delay = s.catchup_delay - delay + MIN_DELAY
                delay = MIN_DELAY
            else
                s.catchup_delay = 0
                delay = delay - catchup_delay
```

```
        if delay < MIN_DELAY
            s.catchup_delay = MIN_DELAY - delay
            delay = MIN_DELAY
        endif
      endif
    else
      delay = MIN_DELAY;
    endif
    s.last_send_time = Time( );
    s.next_send_time = Time( ) + delay;
    s = server_pq->push( )
    s = server_pq->top( )
    delay(s.next_send_time - Time( ));
endloop
```

Figure 8:
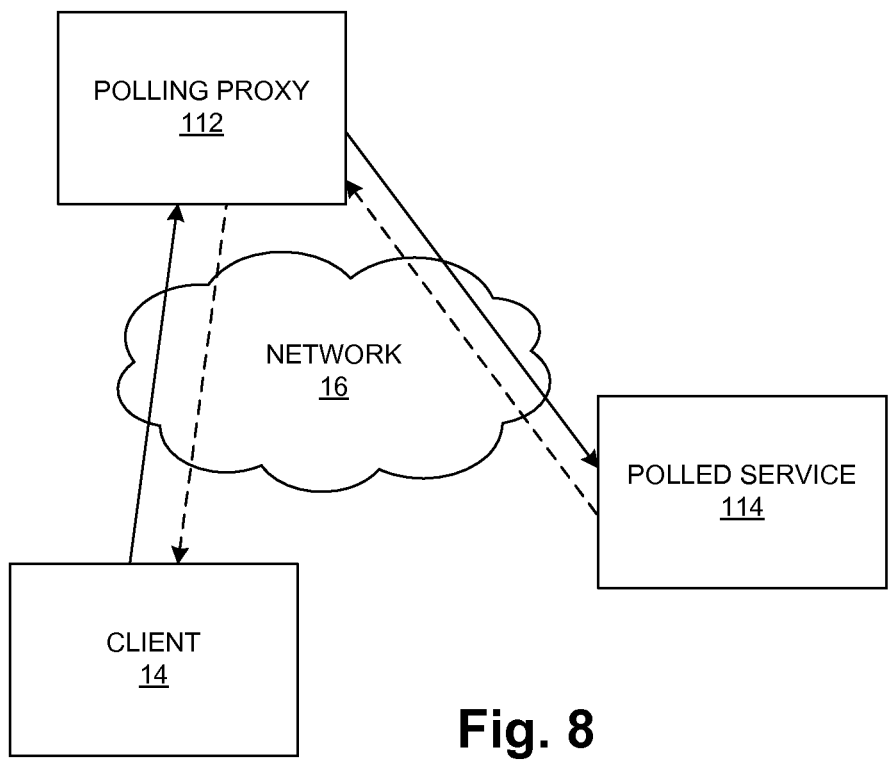
FIG. 8 is a block diagram of a system providing streaming updates from a polled data service.

FIG. 8 is a diagram presenting another aspect of the presently disclosed methods and apparatus, namely the use of a proxy as part of delivering a polled data service to a client, such as news or stock updates, etc. The client 14 can send one request and receive a stream of regular periodic updates without having to issue a corresponding stream of poll requests. The client 14 connects to a polling proxy 112 which parses the configuration and initiates a backend connection to the service 114 which the client 14 wishes to poll. The proxy 112 periodically polls the backend service 114 and streams updates to the client 14.

Figure 9:
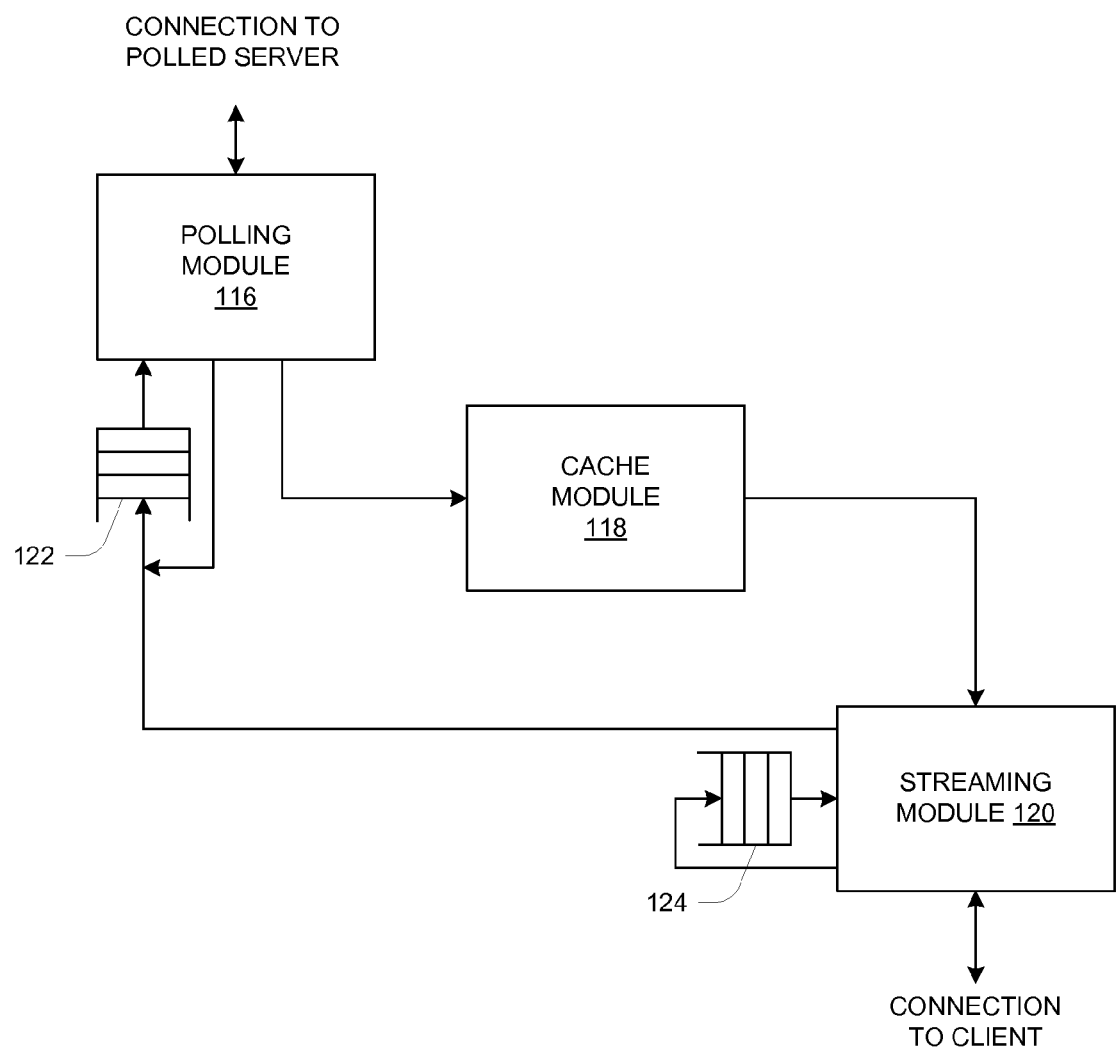
FIG. 9 is a block diagram of an organization of software usable in a proxy server of an update streaming system.

FIG. 9 shows a software organization of the proxy 112 highlighting interactions between a polling module 116 and a streaming module 120, through a cache module 118 and queues 122 and 124. The polling module 116 and the streaming module 120 are both implemented as individual threads within a single software organization as shown in FIG. 9. In another embodiment, each session in the polling module 116 and/or each session in the streaming module 120 could be serviced by its own thread or process. The single thread per module limits the number of threads required, which reduces the server resources required. The queues 122 and 124 allow each thread to manage and prioritize multiple sessions. Each queue is ordered based on absolute time. Sessions are inserted with a target time for next servicing. In the thread per session implementation, a simple delay may be used for pacing, however, to support multiple sessions in a single thread, the priority queue model allows the most immediate session to be identified and serviced first. The delay need only delay as long as is required by the most immediate session.

The streaming module 120 receives and processes requests from the client 14, for streaming of polled data. The streaming module 120 extracts the configuration information from the HTTP request and HTTP headers and writes the configuration information for the new session to the polling module 116. The polling module 116 is signaled by the streaming module 120, with the new session configuration, and a new periodic polling entry is inserted into the polling module's scheduler. Any updates to the session configuration, received by the streaming module 120, are written to the polling module 116 and recognized on subsequent polling requests. The polling module 116 maintains a scheduler which manages the polling delays for each session, through queue 122, and initiates the backend polling requests. Responses from those polling requests are written to the cache module 118. The cache module 118 maintains a current snapshot of polling results for all sessions. The contents of the cache module 118 are updated asynchronously, by the polling module 116. The streaming module 120 maintains a separate scheduler, through queue 124, which manages pacing of client updates for each session, and initiates front end paced responses to the client 14. The streaming module 120 monitors the cache module 118 for updates to the polled response data for each session. When the streaming module 120 scheduler determines it is time to service the next session in queue 124, the cache module 118 is checked, updates are formatted into an update segment and the update is sent to the client 14 over the existing TCP/HTTP connection initiated by the client 14.

It will be appreciated that the streaming update proxy 112 may employ one or multiple processors, and in the case of multiple processors they may be either tightly coupled or loosely coupled, such as the case of separate computer physical enclosures communicatively coupled by a network. The modules 116-120 in general may be distributed across multiple separate processors and employ any of various forms of inter-processor communications as generally known in the art.

Figure 10A:
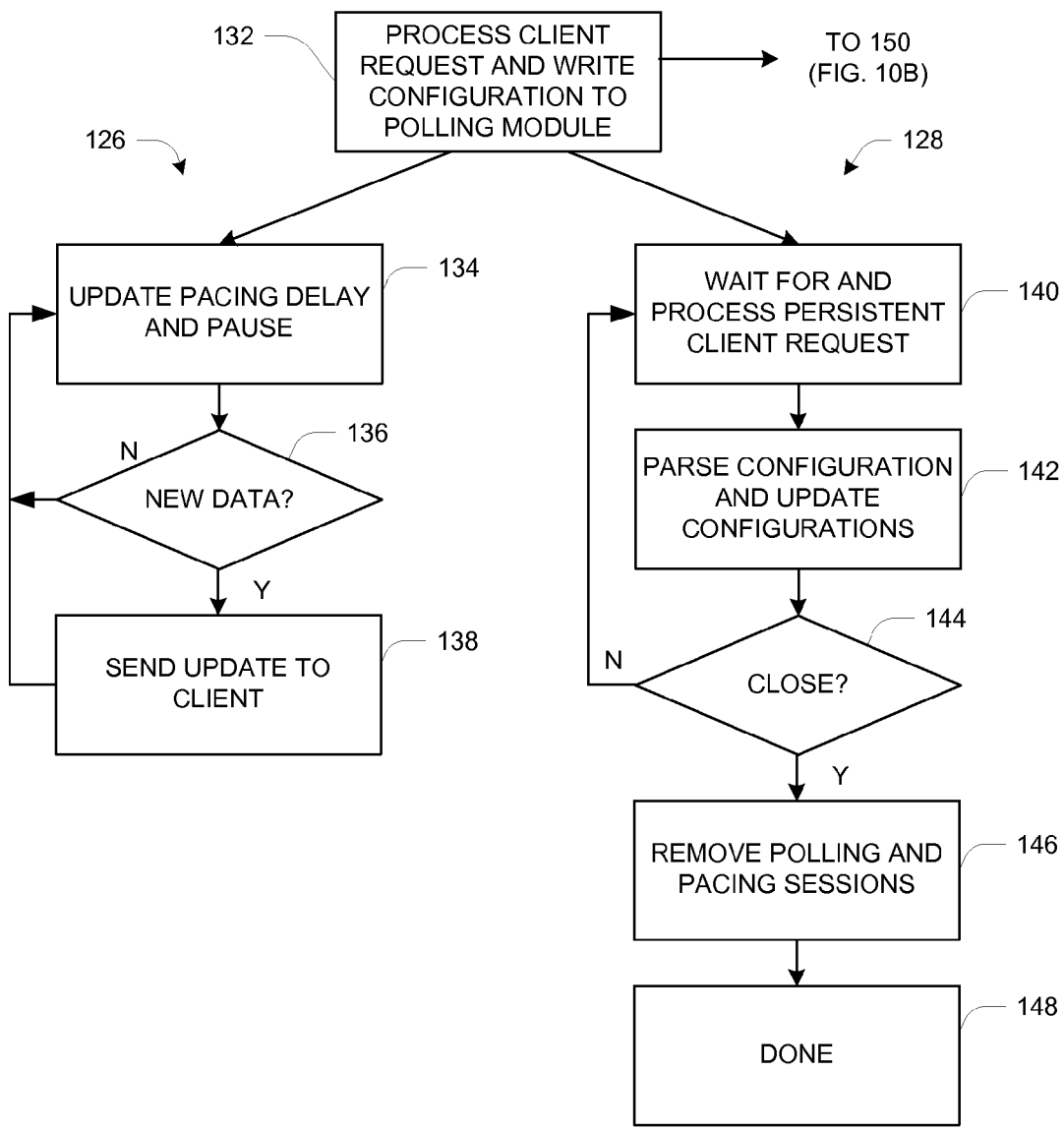
FIGS. 10A and 10B collectively form a flow chart showing a method for servicing an HTTP periodic update request.
Figure 10B:
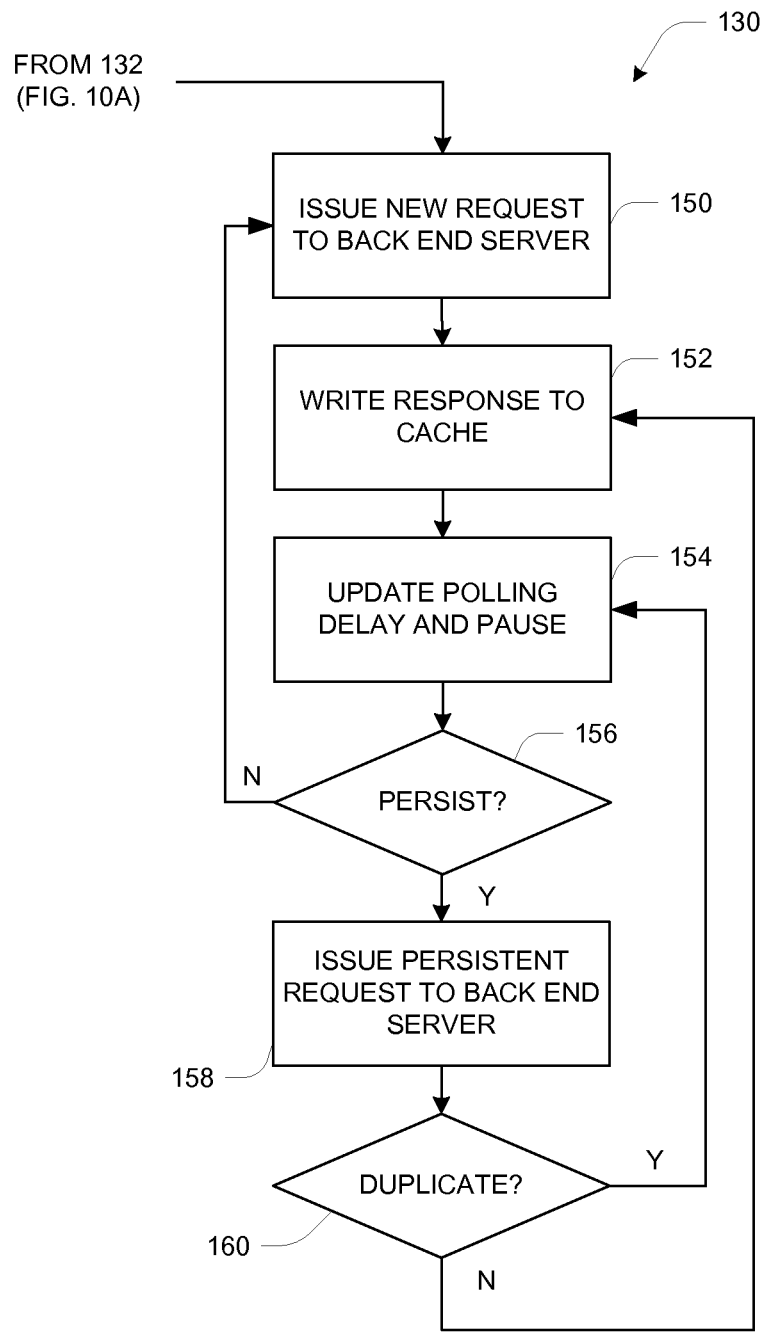

FIGS. 10A and 10B provide a flow chart showing a process for servicing client requests in the system of FIGS. 8-9. The streaming module 120 processing is shown in FIG. 10A and is divided into two parallel sets of functions: send side processing shown as set 126 and receive side processing shown as set 128. The polling module 116 processing is performed in parallel to the streaming module 120 processing, and is shown in FIG. 10B as set of functions 130.

Client requests are received by the streaming module 120, in step 132, and the HTTP request and headers are parsed and the configuration extracted. The pacing configuration is stored for use in the paced sending to the client (126) as well as receive processing (128), and the polling configuration is passed to the polling module 116 for its separate use in the back-end polling operation (130).

The streaming function is handled in steps 134, 136, and 138. The pacing delay, configured by the client 14, is parsed in step 132 (and may be updated in step 142 as described below). The pacing delay is used in step 134 to calculate the next streaming time. The next streaming time is used to insert the pacing session into priority queue 124. The priority queue 124 manages which session should be serviced next, with streaming module 120 delaying until that session is to be service. The priority queue 124 is re-evaluated whenever new sessions are inserted by step 132 or when sessions are updated (step 142 described below). If the streaming module 120 is delaying at the time of the session update, the streaming module 120 is interrupted after the session configurations are updated and the streaming module 120 reevaluates queue 124 to determine the next session to be serviced and the delay until that session is to be serviced. Once a session comes due for processing, step 136 checks to see if new data is available. The cache module 118 is checked to see if the polled data for that session has been updated since the last update was sent for that session. In one embodiment, if no change has occurred, processing goes back to step 134, reinserting the session into priority queue 124 with an updated delay. If the cache module 118 has been updated since the last time the session was processed then processing proceeds to step 138. In another embodiment, even if no change has occurred in the cache module 118, processing proceeds to step 138 for duplicate data send. Data updates are sent to the client in step 138. In one embodiment, a new HTTP chunk is sent with XML formatted response data. In another embodiment, proprietary encoding may be used for the response data.

The receive processing is handled in steps 140, 142, 144, 146, and 148. The initial configuration is parsed in step 132, however, configuration updates are continuously accepted in step 140. The updates are parsed in step 142 and the updated configurations polling and pacing sessions are updated. In one embodiment, configuration updates are sent by the client 14 in additional HTTP entity headers. In another embodiment, configuration updates may be sent in additional HTTP entity body parameters. In another embodiment, configuration updates may be sent in additional pipelined requests, which are processed immediately. Step 144 checks to see if the connection has been closed. If the connection has not been closed, receive processing proceeds back to step 140, to wait for further configuration update processing. If the connection has been closed, processing proceeds to step 146 where the polling and pacing sessions are cleaned up. The polling and pacing sessions are removed from the polling module 116 and streaming module 120 queues 122 and 124, respectively, and the backend and front end connections are closed. Processing is then completed and the process finishes in step 148.

The polling function is handled in steps 150, 152, 154, 156, 158, and 160. The backend service information, configured by the client 14, is parsed in step 132 and updated in step 142. A connection to the backend service 114 is initiated in step 150. A connection is opened and a request for the polled data is issued. The response data is written to the cache module 118, in step 152.

The polling delay, configured by the client, is parsed in step 132 and updated in step 142. The polling delay is used in step 154 to calculate the next polling time. The next polling time is used to insert the polling session into priority queue 122. The priority queue 122 manages which session should be serviced next and the polling module 116 delays until that session is to be service. The priority queue 122 is re-evaluated whenever new sessions are inserted by step 132 or when sessions are updated by step 142. If the polling module 116 is delaying at the time of the session update, the polling module 116 is interrupted after the session configurations are updated and the polling module 116 reevaluates queue 122 to determine the next session to be serviced and the delay until that session is to be serviced. Once a session comes due for processing, step 156 checks to see if persistent HTTP requests should be used. In one embodiment, backend polling is performed over HTTP connections using persistent requests. As long as the backend service 114 which is to be polled for that session has not changed, persistent requests are used and processing proceeds to step 158. Otherwise, processing proceeds back to step 150, where a new backend connection is initiated to the new backend service to be polled. In another embodiment, the backend connection may use a protocol which does not support persistent connections, and processing always proceeds back to step 150 for new connection initiation. In step 158, the persistent request is issued to the backend service. In step 160, the response is checked against the existing response data in the cache module 118. If the data is the same then processing proceeds back to step 154, where the polling delay is recalculated and the session is reinserted into priority queue 122. If the data has changed, processing proceeds back to step 152, where the new data is written to the cache module 118, and then on to 154, where the polling delay is recalculated and the session is reinserted into priority queue 122.

While various embodiments of the invention have been particularly shown and described, it will be understood by those skilled in the art that various changes in form and details may be made therein without departing from the spirit and scope of the invention as defined by the appended claims.

What is claimed is:

1. A computerized server device, comprising:
   memory;
   input/output circuitry including network interface circuitry for coupling the computerized server device to a network; and
   processing logic coupled to the memory and the input/output circuitry and being operative to execute program instructions to cause the computerized server device to perform a method of streaming media data to a client device over the network, the method including:
   receiving a client HTTP request for media data from the network;
   retrieving duration and size information for the media data;
   calculating a target pacing rate for paced delivery of the media data to the client device, the target pacing rate being the quotient of a size of the media data and a duration of rendering of the media data;
   determining a client buffer size and calculating a target burst size;
   transmitting an initial amount of the media data to the client device over the network, the initial amount being equal to the target burst size, the transmitting occurring at a burst rate greater than the target pacing rate; and
   wherein the media data is transmitted to the client device as the initial amount at the burst rate and the remaining amount at the target pacing rate only upon determining that the client HTTP request is either a non-range request type or a range request type which exceeds a predetermined range threshold,
   and wherein the media data is transmitted to the client device in batches using a delay calculated as a segment size divided by the target pacing rate minus a transmission time of a current segment.

2. The computerized server device of claim 1, wherein the client buffer size is specified in seconds, and wherein calculating the target burst size includes multiplying the client buffer size by a constant bit rate which is the quotient of the size and duration of the media data.

3. The computerized server device of claim 1, wherein the method performed by the computerized server device further includes verifying validity of the client HTTP request.

4. The computerized server device of claim 3, wherein verifying validity includes applying a predetermined hash function to user identification information in the client HTTP request.

5. The computerized server device of claim 3, wherein verifying validity includes applying a predetermined hash function to expiration time information in the client HTTP request.

6. The computerized server device of claim 1 wherein the initial amount of the media data is sent in batches to ensure fairness among different sessions of different client devices to which the computerized server device streams respective media data.

7. The computerized server device of claim 1, wherein the segment size may vary from batch to batch.

8. The computerized server device of claim 1, wherein the delay is a non-adjusted delay, and further comprising:
   calculating a catch-up amount reflecting an actual time versus an ideal time of sending a current or prior segment;
   subtracting the catch-up amount from the non-adjusted delay to arrive at an adjusted delay; and
   using the adjusted delay in the batch transmission of the media data.

9. The computerized server device of claim 8, wherein, for a particular sending interval:
   the catch-up amount is subtracted from the non-adjusted delay if the catch-up amount is less than the non-adjusted delay; and if the catch-up amount is more than the non-adjusted delay, then the adjusted delay is set to a minimum delay and the catch-up amount is decreased by the non-adjusted delay and carried forward to a next succeeding sending interval.

10. The computerized server device of claim 1, wherein the input/output circuitry is operative to couple the computerized server device to an origin server device from which the media data is obtained for sending to the client device, and wherein the method performed by the computerized server device further includes:
   issuing a backend request to the origin server device for the media data;
   calculating a backend pacing rate which exceeds the target pacing rate;
   calculating a preload amount which is greater than the target burst size, and retrieving the preload amount of the media data from the origin server device in a burst manner for use in transmitting the initial amount of the media data to the client device at the burst rate; and
   retrieving a remainder amount of the media data from the origin server device in a paced manner at the backend pacing rate for use in transmitting the remaining amount of the media data to the client device at the target pacing rate.

11. The computerized server device of claim 1, wherein the method is performed as part of one of a plurality of active sessions by which media data is streamed to a plurality of client devices, and wherein the burst rate is calculated as the one session's share of a total excess server bandwidth equal to a total available bandwidth minus a non-bursting bandwidth use for all the active sessions.

12. The computerized server device of claim 11, wherein the total excess server bandwidth is divided equally among all actively bursting sessions.

13. The computerized server device of claim 11, wherein the total excess server bandwidth is divided among actively bursting sessions using a priority scheme in which different priorities are assigned to different actively bursting sessions, higher-priority sessions being allocated larger portions of the total excess bandwidth compared to lower-priority sessions.

14. A computerized proxy server device, comprising:
   memory;
   input/output circuitry including network interface circuitry for coupling the computerized proxy server device to a network and to an origin server; and
   processing logic coupled to the memory and the input/output circuitry and being operative with the memory and the input/output circuitry to execute program instructions to cause the computerized proxy server device to perform a method of streaming media data to a client device over the network, the method including:
      receiving a client HTTP request for media data from the network;
      issuing a backend request to the origin server device for the media data;
      retrieving header/metadata information for the media data;
      calculating a client pacing rate for paced delivery of the media data to the client device over the network, the client pacing rate being the quotient of a size for the media data divided by a duration of the media data;
      calculating a backend pacing rate which exceeds the client pacing rate;
      retrieving the media data from the origin server device in a paced manner at the backend pacing rate;
      sending the media data to the client device over the network at the client pacing rate;
      determining a client buffer size and calculating a target burst size;
      transmitting an initial amount of the media data to the client device over the network, the initial amount being equal to the target burst size, the transmitting occurring at a burst rate generally greater than the target pacing rate; and
      transmitting a remaining amount of the media data to the client device over the network at the target pacing rate;
   wherein the media data is transmitted to the client device as the initial amount at the burst rate and the remaining amount at the target pacing rate only upon determining that the client HTTP request is either a non-range request type or a range request type which exceeds a predetermined range threshold,
   and wherein the media data is transmitted to the client device in batches using a delay calculated as a segment size divided by the target pacing rate minus a transmission time of a current segment.

15. The computerized proxy server device of claim 14 wherein issuing the backend request and retrieving the media data from the origin server are performed using HTTP protocol.

16. The computerized proxy server device of claim 15, wherein retrieving the media data from the origin server device in the paced manner includes using limited TCP window size and delayed TCP ACKs.

17. The computerized proxy server device of claim 15, wherein retrieving the media data from the origin server device in the paced manner includes using delayed HTTP range requests.

18. The computerized proxy server device of claim 14, wherein the method performed by the computerized proxy server device by operation of the processing logic, memory and input/output circuitry further includes:
   calculating a preload amount which is greater than the target burst size, and retrieving the preload amount of the media data from the origin server device for use in transmitting the initial amount of the media data to the client device at the burst rate; and
   retrieving a remainder amount of the media data from the origin server device in a paced manner at the backend pacing rate for use in transmitting the remaining amount of the media data to the client device at the target pacing rate.

19. The computerized proxy server device of claim 14, wherein the method performed by the computerized proxy server device by operation of the processing logic, memory and input/output circuitry further includes:
   maintaining a cache used to store the media data retrieved from the origin server and to provide the stored media data for transmission to the client device.

20. The computerized proxy server device of claim 19, wherein the media data is stored in the cache after transmission to the client device is complete, for potential use in satisfying a subsequent client HTTP request for the same media data.

21. The computerized proxy server device of claim 20, wherein:
   the media data is transmitted to the client device as an initial amount and a remaining amount, the initial amount being transmitted at a burst rate generally greater than the client pacing rate, and the remaining amount being transmitted to the client device at the client pacing rate; and the initial amount is retrieved from the origin server and placed into the cache, and the initial amount is transmitted to the client device at the burst rate from the cache.

22. The computerized proxy server device of claim 14, wherein:

the network interface circuitry also couples the computerized proxy server device to a backend server hosting a polled data service; and the execution of the program instructions by the processing logic further causes the computerized proxy server device to perform a method of streaming data updates to the client device over the network, including:

receiving a second client HTTP request for periodically updated data;

issuing a second backend request for a current value of data to the backend server;

calculating a second pacing delay for periodic updates;

scheduling future periodic second backend requests for updated data;

receiving the current data value from the backend server and responding to the second client HTTP request with the current data value;

waiting the second pacing delay for a next periodic backend update; and streaming each future update to the client device after waiting the second pacing delay.

23. The computerized proxy server device of claim 22 wherein the response data is sent using HTTP chunked transfer coding.

24. The computerized proxy server device of claim 23, wherein each periodic update is sent using only one HTTP chunk.

25. The computerized proxy server device of claim 22, wherein HTTP persistent requests are used for polling for backend updates.

26. The computerized proxy server device of claim 22, wherein query string parameters or custom entity headers provide configuration information for the periodic updates.

27. The computerized proxy server device of claim 26, wherein the configuration information specifies at least one of data to be polled; a pacing rate; user credentials for backend data polling; a data format for the periodic updates; and whether or not to send duplicate data if there is no change on the backend.

28. The computerized proxy server device of claim 27, wherein duplicate data is provided to the client device if the second pacing delay is exceeded and no update is available.

29. The computerized proxy server device of claim 28, wherein data for a previous update is cached for use in sending duplicate data.

30. The computerized proxy server device of claim 26, wherein configuration updates are sent in separate HTTP entity headers or separate HTTP entity body parameters of the second client HTTP request.

31. The computerized proxy server device of claim 26, wherein configuration updates are sent in additional pipelined HTTP requests which are processed immediately.

32. The computerized proxy server device of claim 22, wherein no updates are sent to the client device if there are no updates available from the backend.

* * * * *